(12) United States Patent
Xie

(10) Patent No.: US 12,226,931 B1
(45) Date of Patent: Feb. 18, 2025

(54) METHOD AND APPARATUS FOR PRODUCING ENGINEERED STONE SLABS

(71) Applicant: Alex Xie, West Windsor, NJ (US)

(72) Inventor: Alex Xie, West Windsor, NJ (US)

(73) Assignee: SQIP, LLC, Monroe, NJ (US)

( * ) Notice: Subject to any disclaimer, the term of this patent is extended or adjusted under 35 U.S.C. 154(b) by 0 days.

(21) Appl. No.: 18/535,852

(22) Filed: Dec. 11, 2023

(51) Int. Cl.
*B29C 67/00* (2017.01)
*B28B 1/00* (2006.01)
*B28B 3/12* (2006.01)

(52) U.S. Cl.
CPC .............. *B28B 1/005* (2013.01); *B28B 3/123* (2013.01)

(58) Field of Classification Search
CPC .................................. B28B 1/005; B28B 1/123
See application file for complete search history.

(56) References Cited

U.S. PATENT DOCUMENTS

| | | |
|---|---|---|
| 9,511,516 B2 | 12/2016 | Xie |
| 9,707,698 B1 | 7/2017 | Xie |
| 10,376,912 B2 | 8/2019 | Xie |
| 10,751,911 B2 | 8/2020 | Toncelli |
| 10,843,977 B2 | 11/2020 | Xie |
| 2008/0079185 A1 | 4/2008 | Jamrussamee |
| 2015/0042006 A1* | 2/2015 | Kager ................. C04B 40/0071 425/371 |
| 2017/0355101 A1 | 12/2017 | Toncelli |
| 2018/0194164 A1 | 7/2018 | Benito Lopez et al. |
| 2019/0105800 A1 | 4/2019 | Xie |
| 2019/0143743 A1 | 5/2019 | Kwak |
| 2019/0201928 A1* | 7/2019 | Xie ............................ B05C 9/10 |
| 2019/0358851 A1* | 11/2019 | Babini ..................... B28B 3/123 |
| 2020/0282596 A1* | 9/2020 | Qiu .......................... B28C 7/128 |
| 2021/0229313 A1 | 7/2021 | Rodriguez Garcia et al. |
| 2022/0048216 A1 | 2/2022 | Toncelli |
| 2022/0097258 A1 | 3/2022 | Toncelli |
| 2022/0410427 A1* | 12/2022 | Tarozzi ................. B28B 11/001 |

FOREIGN PATENT DOCUMENTS

| | | | |
|---|---|---|---|
| CN | 1669755 A | | 3/2004 |
| CN | 108127767 | | 3/2021 |
| ES | 2713776 B2 | | 5/2019 |
| KR | 102615745 | * | 9/2023 |
| WO | WO2005090034 A1 | | 9/2005 |
| WO | WO2022/172242 A1 | | 8/2022 |

* cited by examiner

*Primary Examiner* — Nicholas R Krasnow
(74) *Attorney, Agent, or Firm* — Harness, Dickey & Pierce, P.L.C.

(57) ABSTRACT

A method for producing engineered stone slabs which includes: compressing composite material to form compressed composite material; fragmenting the compressed composite material into a plurality of fragments of composite material; depositing colorant in a predefined region onto at least part of side walls of some of the plurality of fragments of composite material; and using a device to press, flatten and stretch the plurality of fragments of composite material into a slab. The method may further include moving one or more of the plurality of fragments without substantially breaking or deforming them to form a channel in the plurality of fragments prior to depositing colorant in the predefined region. The device may include a first press roller and a second press roller; wherein the plurality of fragments pass between the first and second press rollers to press, flatten and stretch the plurality of fragments of composite material into the slab.

16 Claims, 15 Drawing Sheets

METHOD AND APPARATUS FOR PRODUCING ENGINEERED STONE SLABS

FIELD OF THE INVENTION

The present application is related to methods and apparatuses for producing engineered stone slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications. The production of engineered stone generally involves particulate materials such as ground quartz rock, crushed glass, rocks, pebbles, sand, shells, silicon, and other inorganic mineral materials combined with polymers, binders, resins, colorants, dyes, etc. The particulate material(s) may be varying sizes ranging from four hundred mesh particle size to four mesh particle size with multiple materials of different sizes used simultaneously. The polymer(s) may include agents such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be evenly distributed into a supporting mold, tray, or other supporting structure. The mixture may also be slightly compressed to make the surface of the distributed material flatter and smooth. The mold or tray containing the damp mixture is then moved onto a conveyor belt with a backing sheet, then a processed damp "slab" is moved into a vacuum press machine to compress the material. The compressed material is then placed into a curing machine to be heated into a hardened quartz slab. After curing, the hardened slab is generally moved to a grinder to be grinded down to a desired thickness, followed by a polisher to finish the product.

Quartz based stone has many advantages over natural stone such as marble and granite. Compared to these natural stones, quartz is harder, stronger, less water absorbent, and more resistant to staining, scratching, breakage, chemicals, and heat. One of the drawbacks of quartz is its perceived lack of natural, random looking veins and color patterns compared with natural stones.

There are various known methods, apparatuses, and system for producing an engineered stone slab with color patterns and veining similar to natural stone.

In various such known methods, a composite material is mixed which may include or may consist of particulate stone or minerals, quartz, glass, shells, or silicon mixed with polymer resins, dyes, binders, hardeners, initiators, or any combination of such previously mentioned materials. The composite material can vary based on a number of factors such as particulate size, resin percentage, colorants used, or composition. Notably colorant mixtures of resin and colorant, or only colorant in either liquid, powder or other particle format may be considered a composite mixture. This composite material or plurality of composite materials may undergo a process as disclosed in U.S. Pat. No. 10,376,912B2, which is incorporated by reference herein, to achieve a natural stone aesthetic. Prior to or subsequently, the composite material may undergo further processes such as disclosed in U.S. Pat. No. 9,707,698 B1 and U.S. Pat. No. 10,843,977 B2 to Xie, which are incorporated by reference herein.

U.S. Pat. No. 9,707,698 B1 by Xie discloses a process in which the composite materials undergo a process consisting of layering, compressing, and disrupting the composite material or plurality composite materials in order to achieve a natural stone aesthetic. The prior art discloses processes in which prior to compressing the composite materials by a manner such as using a press roller, the composite material may be manipulated either by slightly pressing the composite material, disrupting the composite material, or using a gate device in order to scrape any excess material to achieve a layer of a substantially flat or smooth top surface of the composite material.

In the prior art such as US application US20220048216A1 by Toncelli, it is specifically mentioned that different materials are laid on top of each other on a substantially flat surface. The materials are then pressed or sandwiched together. The material is then folded and pressed again. This will lead to a layer of colorant that is substantially on the same horizontal plane of the material, and not cause any blending or deformation in the vertical direction.

In the prior art such as U.S. Pat. No. 9,707,698B1 and U.S. Pat. No. 10,843,977 by Xie, the colorant or differently colored composite mixtures are contained within each fragment. Therefore, the vein length after undergoing compression such as through a press roller will not extend to connect various other fragments.

One method to ensure that a significant amount of vertical surface area is coated by colorant is to have a device similar to the one taught by US published patent application no. 2019/0105800, published Apr. 11, 2014, to Xie in which a carving device or a V-shape cutting wheel attached to a CNC controlled by a computer travels through a composite material to form a channel. Subsequently, colorant is deposited onto the channel walls. The drawback to what is taught in US published patent application no. 2019/0105800, which is incorporated by reference is that the devices are meant to carve through the material. This will lead to undesirable and artificial looking straight and clean lines which are exacerbated when passed through a press roller.

SUMMARY OF THE INVENTION

One or more embodiments of the present invention provide methods and apparatuses for producing an engineering stone slab, in which the composite material may be significantly varied in fragment size in order to achieve a more realistic natural stone aesthetic. These fragments are then squeezed and compressed into a flat uncured slab by a press roller or a pair of press rollers.

In at least one embodiment of the present invention, aggregate minerals such as quartz grits and powder may be combined with resin, colorant and other additives in a high-speed mixer to obtain a damp composite material. This composite material may be compressed into a condensed composite mixture as known in the art.

After the known condensed composite material is formed, in at least one embodiment of the present invention, the known condensed composite material is broken into a plurality of fragments in a controlled manner such as by a stirring device to disrupt the condensed composite mixture in which the rotational speed of the stirring device may vary so that the faster the stirring device rotates to break the condensed composite material, the smaller the fragments will be. Alternatively, the condensed composite mixture may be dropped onto a rigid grid or sieve. By controlling the rigid grid or sieve size and/or height of the drop, it is possible to obtain fragments of a desired size or sizes. There are other means of obtaining these desired sized fragments.

These random shaped fragments of composite material are then evenly and/or loosely distributed onto a supporting structure such as a conveyor belt so that there is not substantially more composite material in one region compared to another. Ideally there are no regions where smaller fragments are significantly piled up next to a large fragment, thereby blocking the side walls of the large fragment from having colorant deposited onto it. In general, any region of square foot should not have 50% more material than another square foot region. In addition, if the random shaped fragments are piled up too high, the pressure may begin to compress the fragments together and lose their shape.

The advantage of processing and depositing the random shaped fragments composite material in this manner is that as additional layers of composite material are added in certain areas such as by spraying colorant onto the previous layers in predefined areas, the colorant will be applied also to the side walls of the random shaped fragments. These side walls may be random shapes as opposed to smooth, flat surfaces. This leads to a greater surface area in which the colorant layer is applied compared to a slightly compressed composite material in which the surface of the slightly compressed composite material is substantially flat, and therefore colorant is only applied to the top surface. The number of random shaped fragments may vary, and the height of the random shaped fragments distributed onto the belt may be greater or much greater than the specified distance between the press roller and the belt, or between a pair of press rollers in an alternative method. Therefore, when the random shaped fragments are fed through the press roller, there will be an accumulation of material at the front of the press roller. The height of this accumulation may be controlled by a number of factors including belt speed, press roller rotational speed, height or average height of the random shaped fragments distributed on the belt, and distance between the press roller and the belt. The random shaped fragments of composite material will be squeezed by the roller and deformed into one piece to form a flat slab once it passes through the roller. The larger random shaped fragments also have a tendency to be squeezed away from the press roller more towards smaller random shaped fragments, therefore shifting the vein pattern created by the colorant deposited on the side walls of the random shaped fragments.

Notably while covering more surface area of any particular random shaped fragment is desirable, coating more of the side walls, or vertical surfaces, of a random shaped fragment is also important, depending on the desired final design aesthetic. The press roller has a tendency to substantially stretch the composite material in the horizontal direction, but very little stretching in the vertical direction. Therefore, if colorant is only on the top surface of the composite material, or if the composite material is slightly pressed with a flat top surface, the colorant will substantially remain on the top surface after passing through the press roller. For example, if a random shaped fragment has significantly more horizontal surface area such as a flat disc, all the colorant on the top surface of the disc will remain substantially on top after passing through the press roller. This will lead to the colorant appearing on the horizontal top surface of the slab as opposed to having a through bodied appearance in the vertical direction. If however the random shaped fragment is a cylinder with more height than width and colorant is applied throughout the height of the side walls, the colorant on the randomly shaped vertical surface will elongate in the horizontal direction after passing through the press roller and deformed. The subsequent appearance of the slab will not only have visible colorant veining on the horizontal surface, but also will have random veining through the body of the slab in the vertical direction.

There are other methods aside from press rollers in order to achieve the same effect, such as using pressure to squeeze the composite material through a narrow opening such as in injection molding.

One embodiment of the present invention may include a nudging device controlled by CNC (computer numerical control) in which a narrow head is used so that the device does not carve through the random shaped fragments, breaking or compressing them. Rather this device will slightly push the random shaped fragments aside and retain their random shape. An elongated narrow tail made from a flat rigid plate may be attached to the head and oscillate back and forth like a pendulum to further push the random shaped fragments aside, but not push so hard as to deform or break the random shaped fragments. This device forms a channel which has a somewhat random edge profile due to the random shape of the fragments pushed aside which are not broken or deformed. This allows for a more realistic veining effect once the channel walls are coated with colorant and elongated through the press roller. This contrasts with the smooth channel walls formed using a V-shaped cutting wheel type device, or any other form of cutting device that travels through the composite material. After the channels are formed, additional layers of composite material or colorant may be applied to predefined areas that may include the channels. One example of such a method includes use of a spray gun controlled by CNC to deposit colorant on top of certain regions of the random shaped fragments. In this manner the side walls of the randomly shaped fragments that have been moved by the nudging device has colorant deposited onto them. Due to the proximity of each random shaped fragment along the path in which colorant is deposited, the colorant on each random shaped fragment will stretch into the adjoining random shaped fragment, simulating the appearance of a continuous long vein in the slab after passing through the press roller. Since each random shaped fragment is squeezed and deformed differently, the continuous long vein will have a somewhat random zig zag pattern, better simulating the random veining found in natural stone.

The size of the random shaped fragments is important in controlling the amount of volume that has colorant applied to it. Since the colorant is only deposited on the outer surface of any given random shaped fragment, as random shaped fragment size gets smaller, there is less volume that has the original color of the composite material as opposed to the color of the colorant, until the particle size becomes so small as to change the color of the entirety of the composite material to the color of the colorant. After passing through the press roller the smaller fragments would lead to an undesirable monochrome or short veined appearance.

Another method to ensure that a significant amount of vertical surface area is coated by colorant is to deposit random shaped fragments that are significantly larger than others. The colorant may be applied to the large random shaped fragments prior to or after depositing onto the supporting structure. The location in which each large random shaped fragment is deposited may be controlled or predefined. This will ensure that a significant portion of the large random shaped fragment's side walls are coated in colorant, and if enough of these large random shaped fragments are close together, after passing through the press roller the random shaped fragments will connect and create a long zig zagged veined effect.

The larger the random shaped fragment sizes distributed on the belt, or the more random shaped fragments that are piled up in front of the press roller relative to the distance between the press roller and the belt, the more deformed and stretched the composite material will become after passing through the press roller, or a pair of rollers. This will result in elongated veining that is somewhat controllably stretched or deformed depending on how much composite material is piled up in front of the press roller. If not enough composite material is piled up in front of the press roller, the amount the composite material is stretched or deformed will be minimal. To an extreme, if there is not enough material the fragments will not be compressed and exit the press roller as fragments and not a single piece of a flat slab. If too much material is piled up in front of the press roller, the composite material will stretch too much. There is a specific amount of stretching or deformation desired depending on what final design aesthetic is required. In addition, the speed of the belt may be increased in order to cause more random shaped fragments to pile up in front of the press roller or slowed down to cause less random shaped fragments to pile up in front of the press roller.

The rotational speed of the press roller or pair of press rollers as well as the height between the belt and the press roller or the height between a pair of press rollers will also influence the degree of stretching or deformation of the random shaped fragments of composite material.

In one or more embodiments of the current invention, the colorant is deposited along a predefined pattern or track that connects a plurality of fragments by depositing colorant not only on the surface but also along the height of the side walls of the fragments. After depositing the colorant and passing through the press roller, the subsequent elongated through bodied veins will be obtained as a continuous vein in the processed slab.

More than one kind of colorant may be deposited at a predefined region of the fragments of composite material, and the colorant may or may not be deposited at the same time. The amount of each colorant to be deposited may be controlled by computer.

In one or more embodiments of the current invention, random shaped fragment size and/or location is controlled in combination with a variety of methods of applying additional layers of composite material or colorant to specific locations in order to coat a desired amount of surface area or vertical surface area of the random shaped fragments. After applying the colorant, the composite material is processed through a press roller, or a pair of press rollers or other similar stretching and compressing device in order to form a desired aesthetic that better simulates natural stone. One or more embodiments of the present invention provide an apparatus and device to push fragments aside to expose more surface area or side walls of the randomly shaped fragments while still maintaining the fragment shape and not breaking or deforming the fragments.

One or more embodiments of the present invention store and adjust variables in computer memory to control which colorant, the amount of each of the colorant, which region of the composite material for the colorant to be deposited, and how much the composite material deforms and stretches after passing through one or more press rollers. The distance between the press roller and the belt, or the distance between a pair of rollers, the height and amount of fragments of composite material, and the speed of the belt feeding the press roller may all be controlled in at least one embodiment.

A significant advantage of the present invention is the ability to have a continuous run of material as opposed to forming slabs one at a time in the color formation process prior to vibration and compaction of the slab. In addition to cost savings it may be aesthetically advantageous to produce lengths of slabs longer than a standard slab length (where the standard slab length typically is 3.2 meters). This is because if you were to produce a single slab, the degree of stretching present at the front or back of the slab may be significantly different than in the middle since there is not enough material accumulated in front of the press roller at these points. If for example a length of ten slabs were produced continuously, the material at the front and back of the length of slabs may be discarded and the remainder cut into 3.2 meter length increments for further processing.

Another significant advantage of the present invention is the ability to save material cost. It is very difficult to distribute material evenly throughout a large enough format such as the area of a slab, which may be 1.6 meters×3.2 meters with an example thickness of 60.0 mm. The vibration and compaction step may level local regions out, however if one end of the slab has more material than the other end, it is difficult to level. In production the slabs are generally produced thicker than would otherwise be necessary in order to accommodate this unevenness, and grind the slab down to the correct size in a later step in the process. For example, if a final product thickness of 30.0 mm is desired, a slab thickness of 36.0 mm may be produced and later grinded and polished to 30.0 mm, wasting some of the additional 6.0 mm of material. By using a press roller or similar device to squeeze any excess material flat, it is possible to produce slabs that are much more consistent and flat compared to the prior art, allowing for the production of slabs thinner than 36.0 mm prior to grinding while still maintaining a final product thickness of 30.0 mm.

In at least one embodiment, a method for producing engineered stone slabs is provided which includes: compressing composite material to form compressed composite material; fragmenting the compressed composite material into a plurality of fragments of composite material; depositing colorant in a predefined region onto at least part of side walls of some of the plurality of fragments of composite material; and using a device to press, flatten and stretch the plurality of fragments of composite material into a slab.

The method may further include moving one or more of the plurality of fragments without substantially breaking or deforming them to form a channel in the plurality of fragments prior to depositing colorant in the predefined region.

The device used to press, flatten and stretch the plurality of fragments may include a first press roller and a second press roller; wherein the plurality of fragments pass between the first and second press rollers to press, flatten and stretch the plurality of fragments of composite material into the slab.

In at least one embodiment of the present invention, a portion of the plurality of fragments with colorant deposited onto them are arranged in a predefined pattern on a supporting structure prior to using the device to press, flatten and stretch the plurality of fragments of composite material into the slab.

In at least one embodiment of the present invention, at least a first set of fragments of the plurality of fragments are arranged in a predefined pattern on a supporting structure prior to depositing colorant on the at least first set of the plurality of fragments.

DETAILED DESCRIPTION OF THE DRAWINGS

Figure 1:
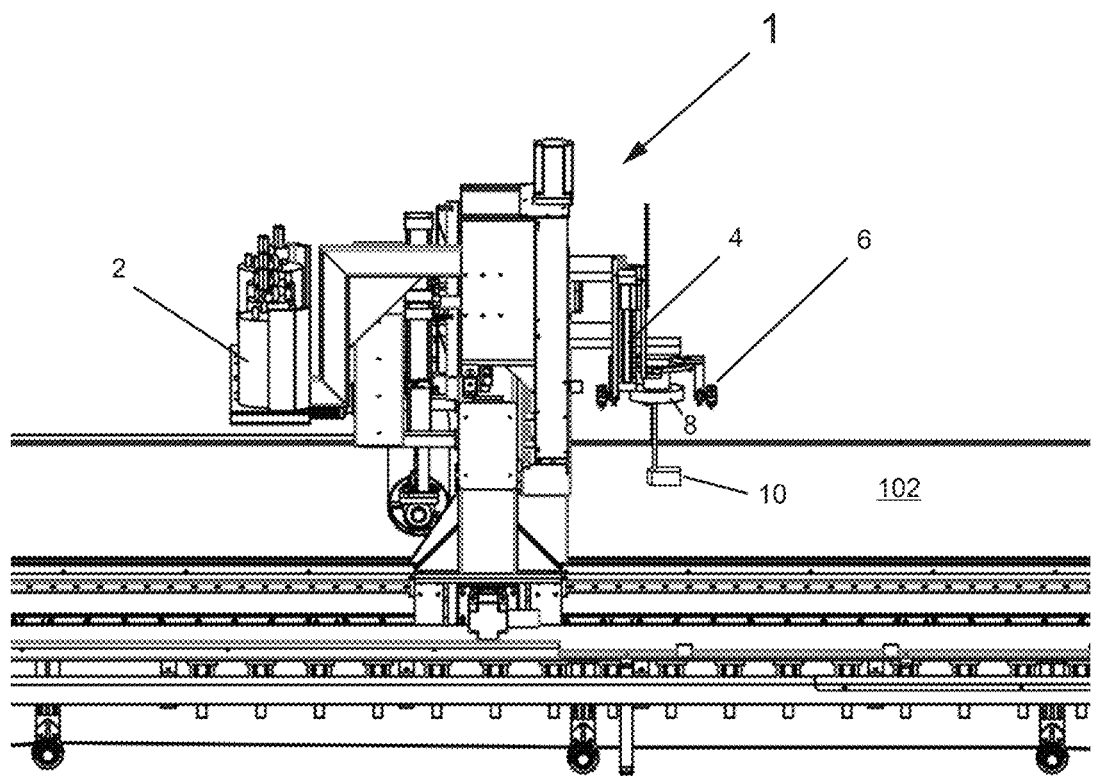
FIG. 1 is a perspective view of part of a first apparatus in accordance with an embodiment of the present invention.
Figure 3:
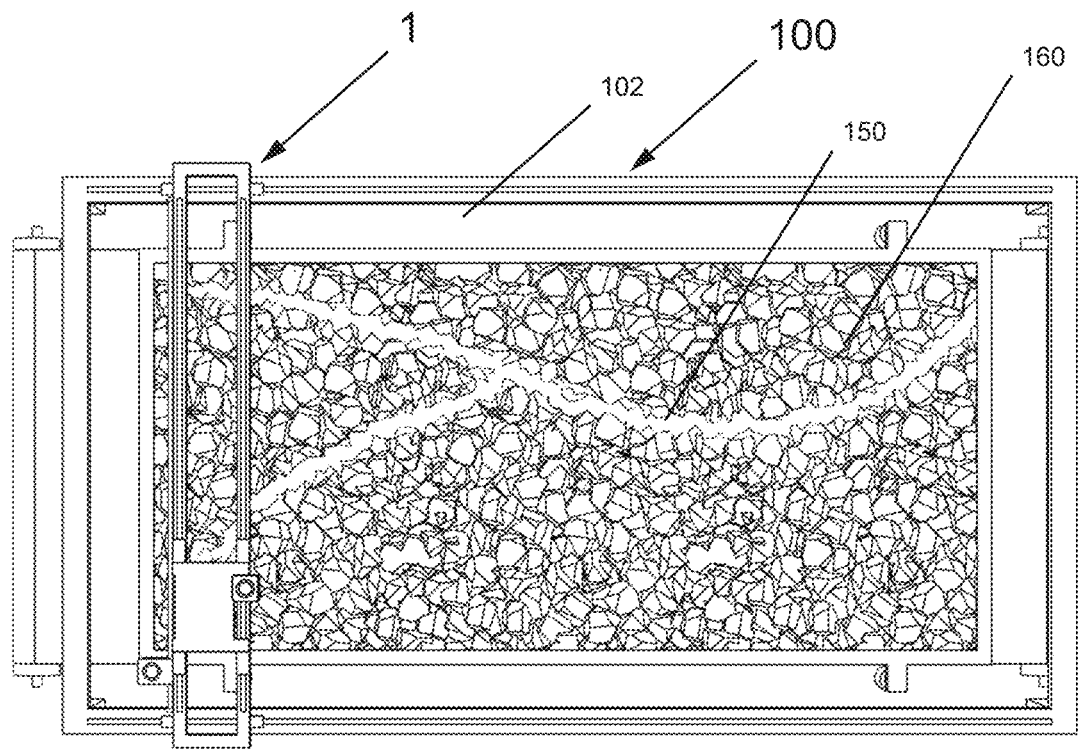
FIG. 3 shows a simplified top view of the first apparatus, which is partly shown in FIG. 1, in a state where a nudging device of the apparatus has formed a channel in a composite material while retaining a random shape of side walls of fragments.

FIG. 1 is a perspective view of part of a first apparatus 1, which is shown in FIG. 3, in accordance with an embodiment of the present invention.

Figure 2:
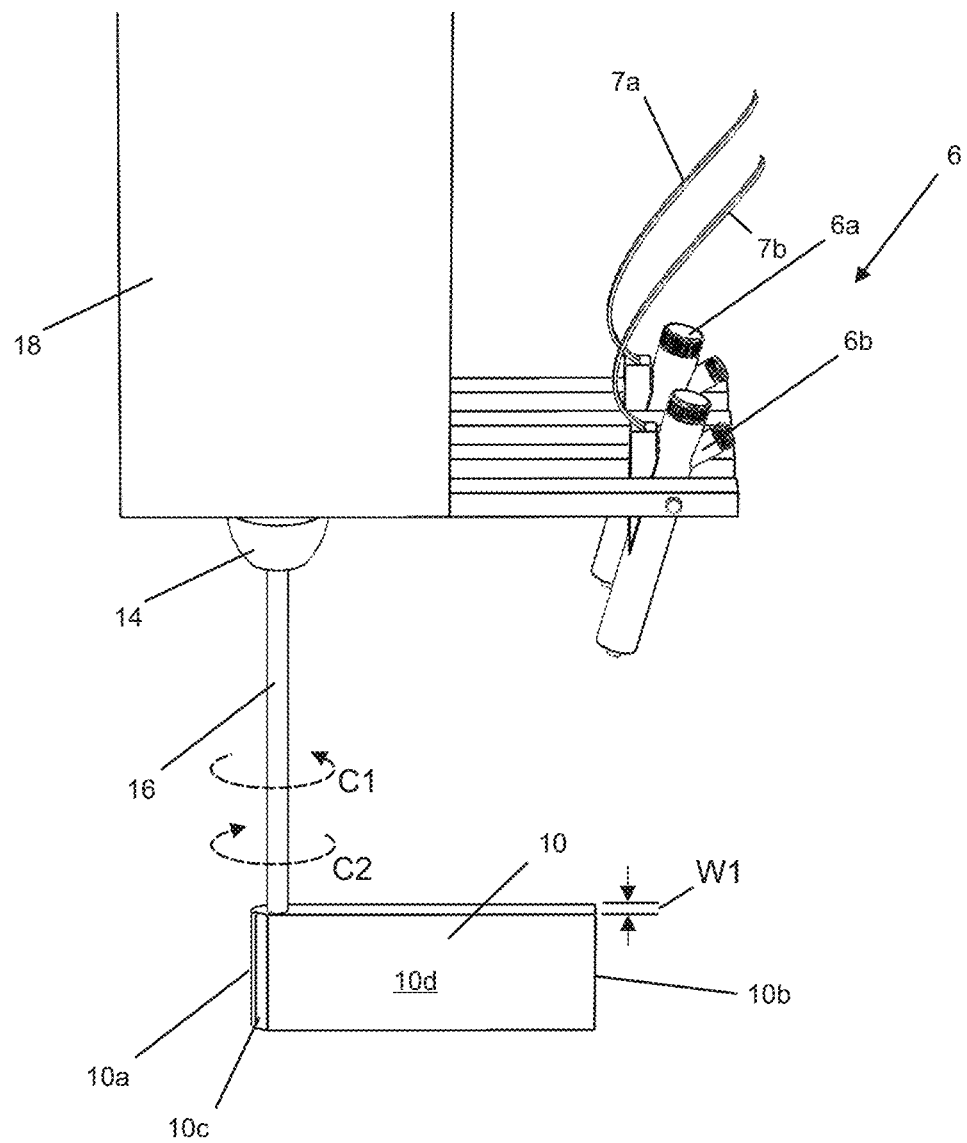
FIG. 2 shows a close up simplified perspective view of a portion of the first apparatus of FIG. 1.

FIG. 2 shows a close up simplified perspective view of a portion of the first apparatus 1. As shown in FIG. 2, the apparatus 1 includes motor 18, member 14, shaft 16, nudging device 10, and spray device 6. The spray device 6 includes tubes 7a and 7b which feed spray nozzles 6a and 6b, respectively. The shaft 16 is configured to be rotated by motor 18 and member 14 in the directions C1 (counterclockwise) or C2 (clockwise) to rotate the nudging device 10 about the shaft 16.

FIG. 3 shows a simplified top view of the first apparatus 1, in a state where a nudging device 10 of the apparatus 1 has formed channels 150 in a composite material 160 while retaining a random shape of side walls of fragments of the composite material 160.

Figure 4:
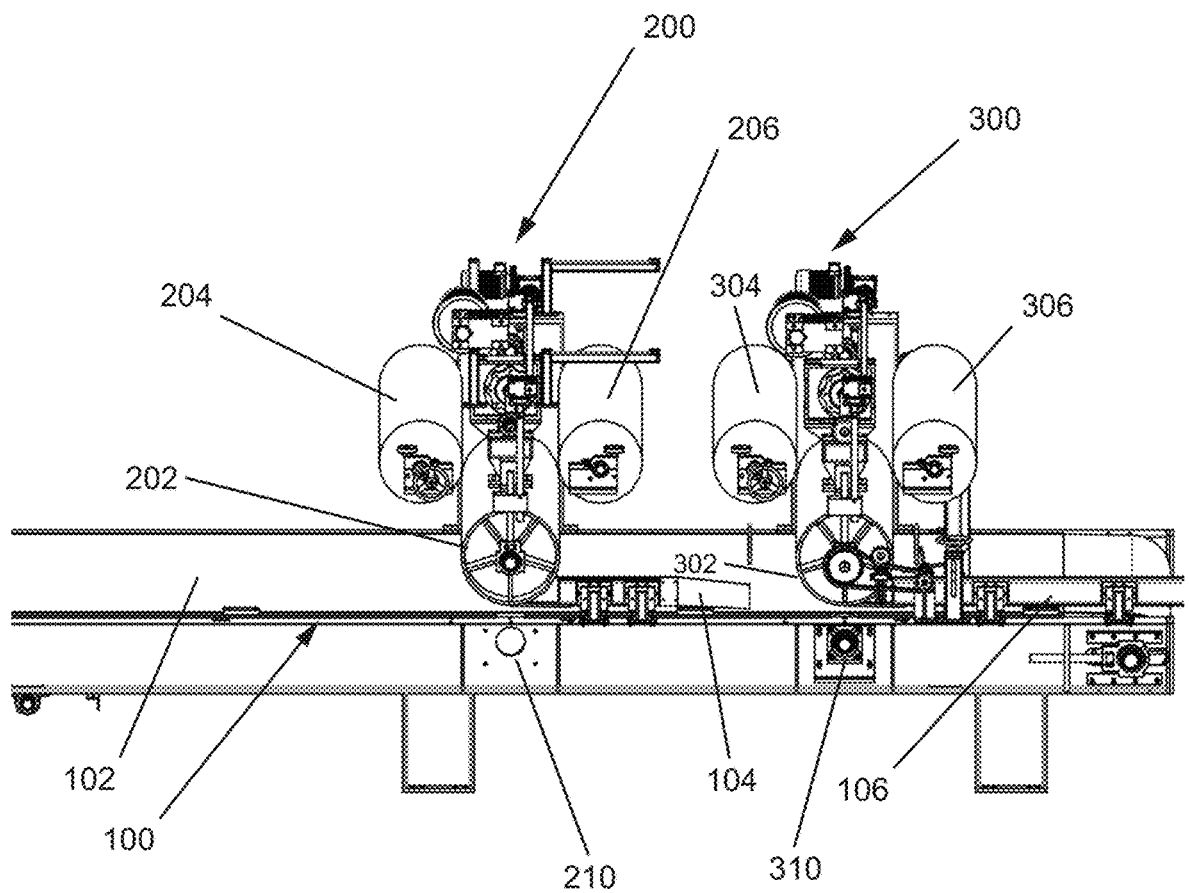
FIG. 4 shows a perspective view of a second apparatus in accordance with an embodiment of the present invention.

FIG. 4 shows a perspective view of a second apparatus in accordance with an embodiment of the present invention, wherein the second apparatus includes a press roller device 200 and a press roller device 300. The press roller device 200 includes a press roller 202 and bottom press roller 210 and the press roller device 300 includes a press roller 302 and bottom press roller 310. The press roller device 200 also includes film remover 204 and film dispenser 206. The press roller device 300 also includes film remover 304 and film dispenser 306.

Figure 5:
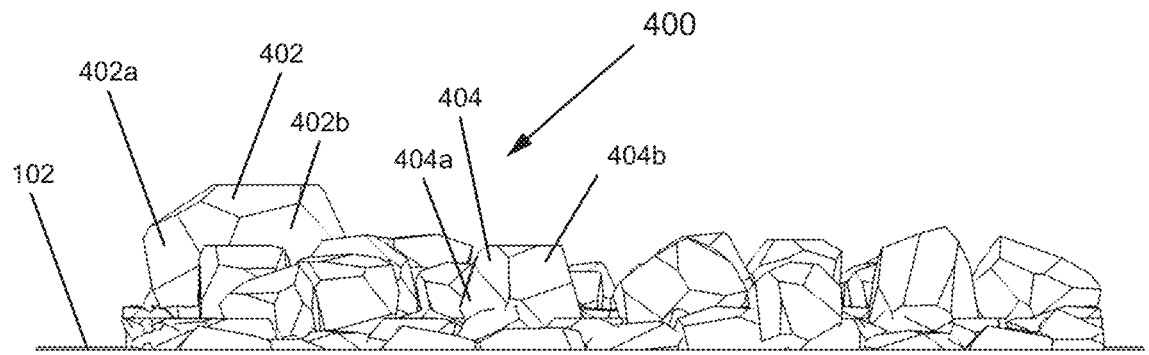
FIG. 5 shows a simplified side view of a composite material demonstrating various fragment sizes and random orientations of the sides of the fragments.

FIG. 5 shows a simplified side view of a composite material 400 demonstrating various fragment sizes and random orientations of the sides of the fragments. The composite material 400 includes a plurality of fragments including fragment 402 and fragment 404. The fragment 402 has sides 402a and 402b, and the fragment 404 has side including sides 404a and 404b. The sides 402a, 402b, 404a, and 404b are oriented differently with respect to the conveyor belt surface of conveyor belt 102.

Figure 6:
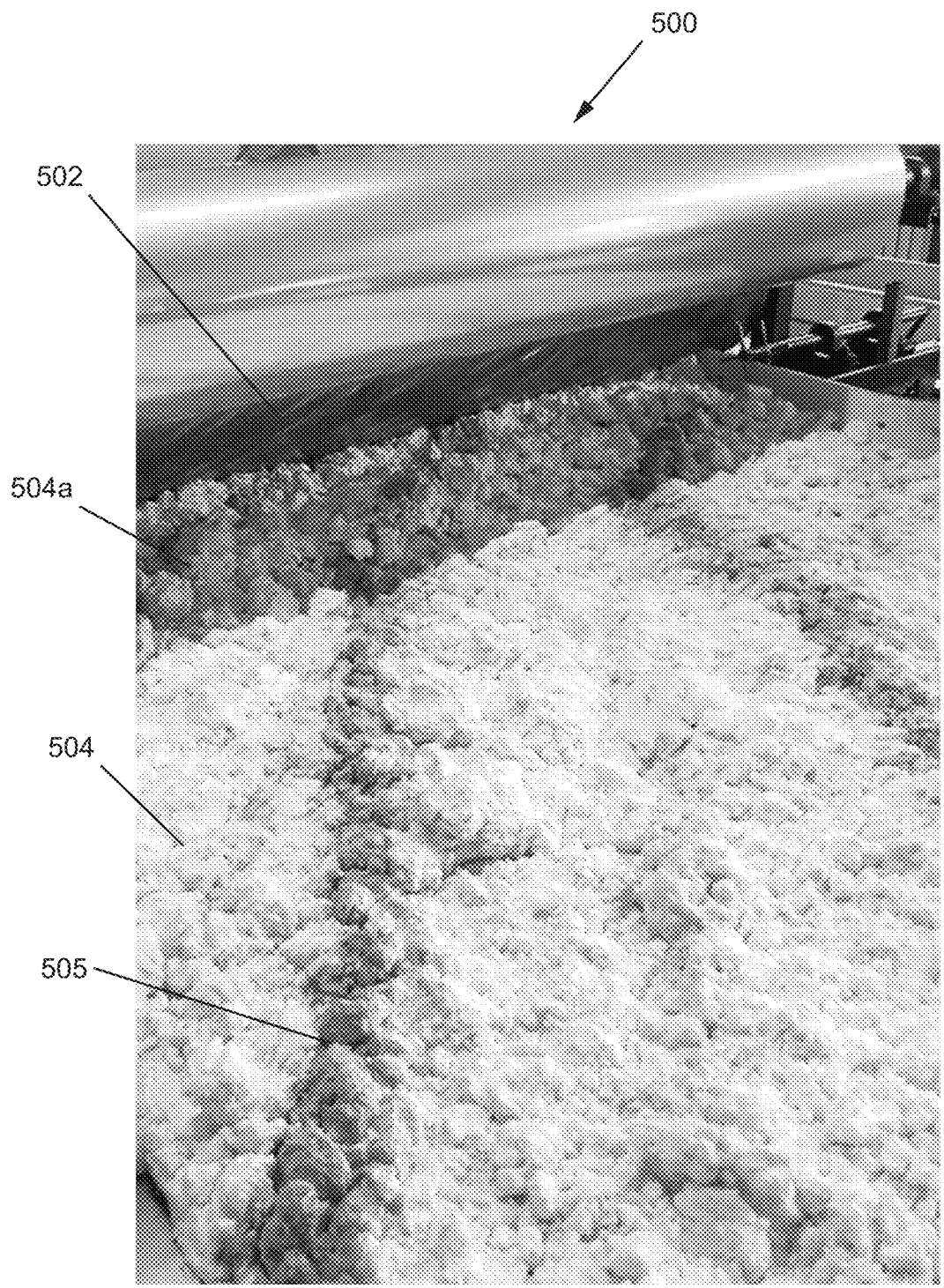
FIG. 6 shows a picture of fragments after a track of colorant has been applied as the fragments enter a press roller, and the extra amount of piled up fragments right in front of the press roller.

FIG. 6 shows a photograph 500 which shows fragments 504 after a track of colorant has been applied before the fragments enter a press roller 502. A region 504a of fragments 504 is identified where the fragments of region 504a are "piled up".

Figure 7:
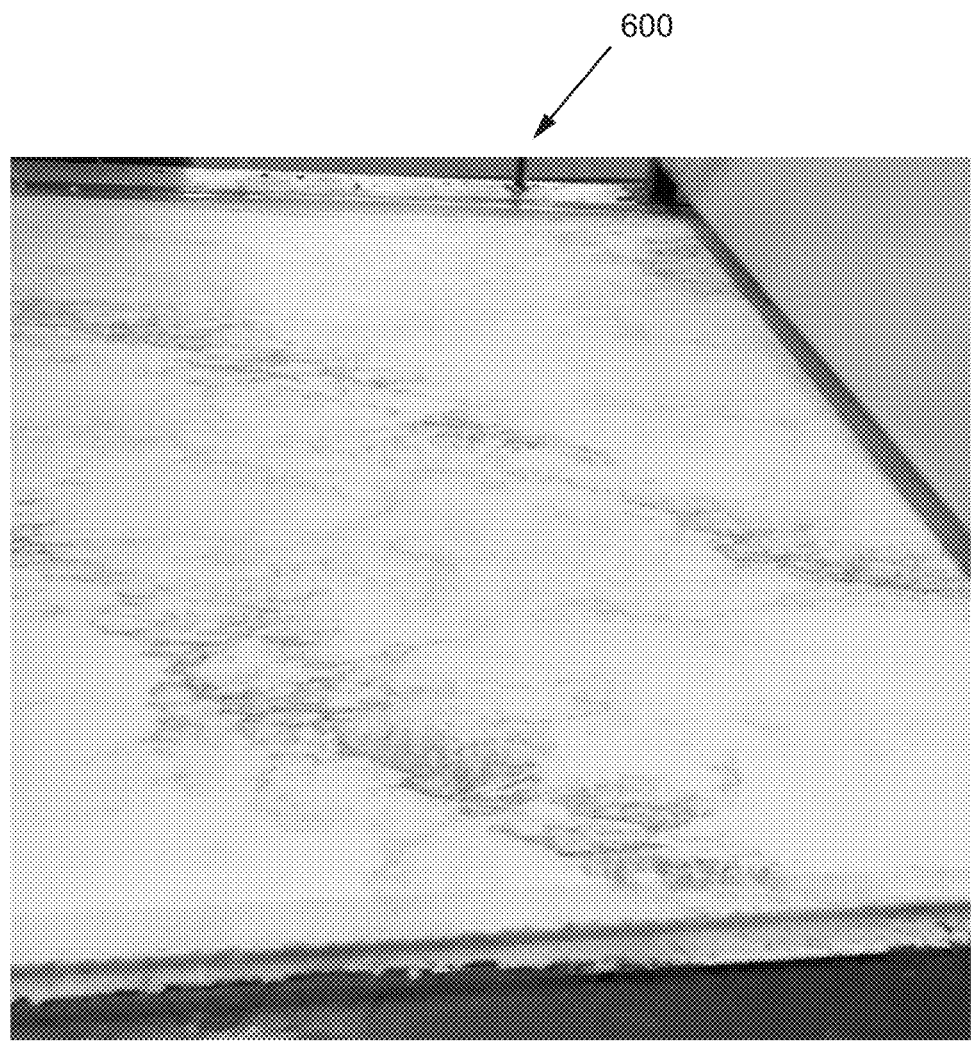
FIG. 7 shows fragments as they exit a press roller in which the fragments have been pressed together into one piece to form a flat slab, in which the fragments have been deformed and stretched, creating zig zagging through bodied veins in the slab.

FIG. 7 shows fragments 600 as they exit a press roller in which the fragments have been pressed together as one piece of a slab, flattened and stretched.

Figure 8:
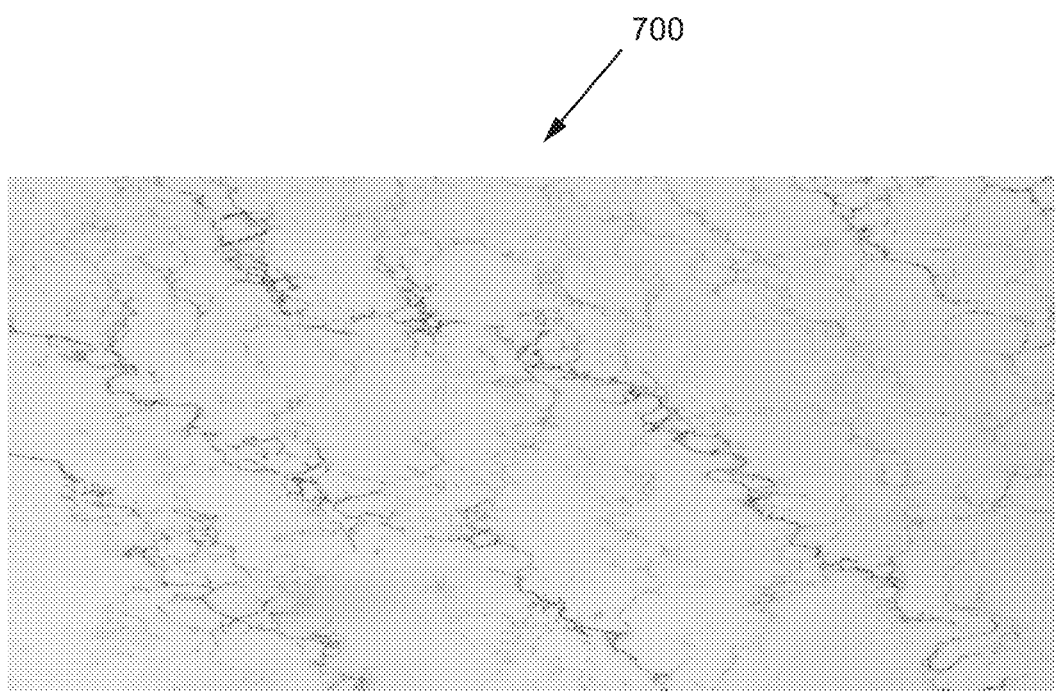
FIG. 8 shows a finished slab after trimming, grinding and polishing and undergoing the processes shown by FIG. 6 and FIG. 7.

FIG. 8 is an image 700 of a finished slab after compacting, curing, trimming, grinding and polishing and undergoing the processes shown by FIG. 6 and FIG. 8.

Figure 9:
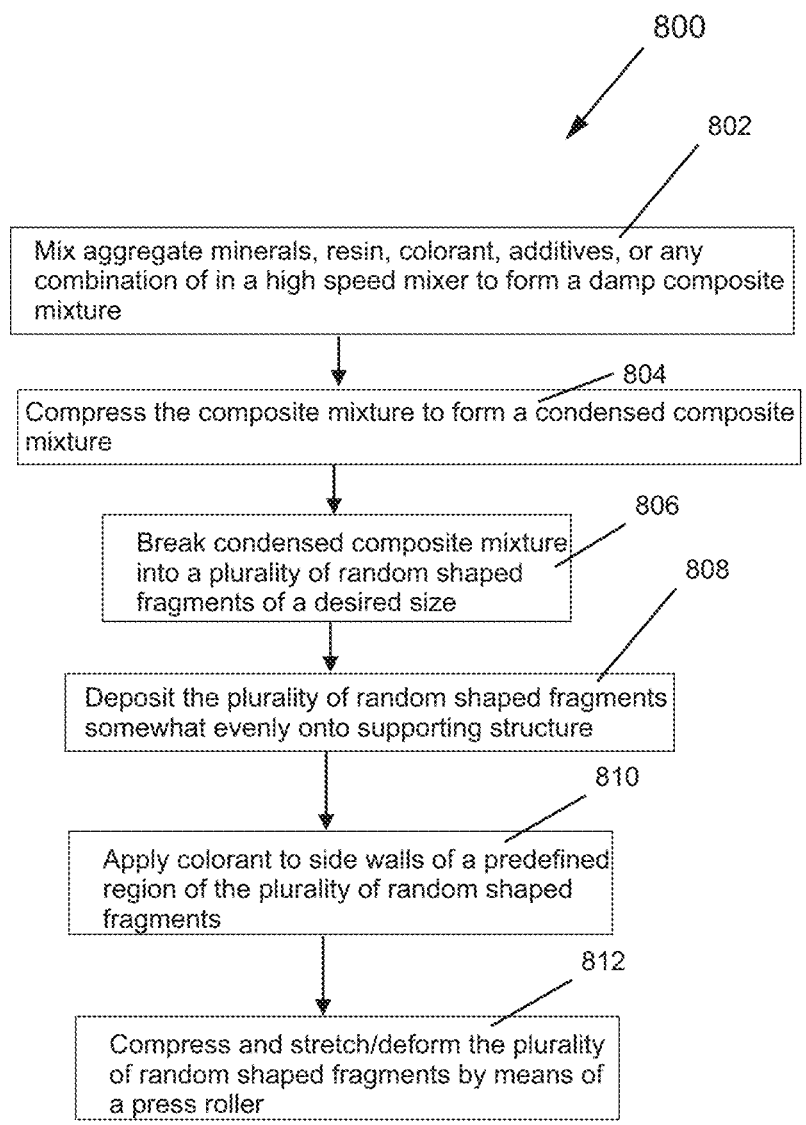
FIG. 9 shows a flow chart of a method in accordance with an embodiment of the present invention.

FIG. 9 shows a flow chart 800 of a method in accordance with an embodiment of the present invention.

Aggregate minerals such as quartz grits and powder may be combined with resin, colorant and other additives in a high-speed mixer to obtain a damp composite material at step 802. This composite material is compressed into a condensed composite mixture at step 804.

At step 806 of FIG. 9, a condensed composite mixture is broken up into a plurality of fragments. The breaking up of the condensed composite mixture into a plurality of fragments is preferably done in a controlled manner such as by a stirring device to disrupt the condensed composite mixture in which the rotational speed of the stirring device may vary so that the faster the stirring device rotates to break the condensed composite material, the smaller the fragments will be.

Alternatively, the condensed composite mixture may be dropped onto a rigid grid or sieve to break the condensed composite mixture into chunks or random shaped fragments of composite material. By controlling the sieve size and/or height of the drop, it is possible to obtain fragments of a desired size or sizes.

There are other means of obtaining the plurality of fragments. Fragment size may vary depending on the desired final aesthetic, however, each three dimensional fragment of the plurality of fragments referred to in step 802 may be described as having a width, length, and height, and the largest dimension of the width, length, and height preferably ranges between 25.0 mm and 250.0 mm. The size of the fragments is determined by the amount of veining desired on the final aesthetic. In general, the larger the fragment the larger the veining will be after processing through a press roller or a pair of press rollers.

The shape of each fragment is typically preferred to be random, because if the fragments are too uniform the resultant veining after processing through a press roller will be too mechanical or artificial looking.

At step 808 of FIG. 9, the plurality of fragments are deposited somewhat evenly onto a supporting structure, such as onto a conveyor belt so as to avoid regions in which there is substantially more composite material than others.

At step 810 of FIG. 9, colorant is applied to the side walls of the plurality of fragments.

At step 812 of FIG. 9, the random shaped fragments are compressed and stretched/deformed by a press roller, pair of press rollers, or other device.

In at least one embodiment of the present invention, the condensed composite material specified in step 806 is formed.

The advantage of processing and depositing the plurality of fragments in this manner is that as additional layers of composite material are added in certain areas such as by spraying colorant onto the previous layers in predefined areas, the colorant will be applied also to the side walls of the random shaped fragments. These side walls are typically random shapes as opposed to smooth, flat surfaces. This leads to a greater surface area in which the colorant layer is applied compared to a slightly compressed composite material in which the surface of the slightly compressed composite material is substantially flat, and therefore colorant is only applied substantially to the top surface.

The number of random shaped fragments distributed onto the belt may vary, and the height of the random shaped fragments distributed onto the belt may be greater or much greater than the specified distance between the press roller and the belt or between a pair of press rollers in an alternative method. Therefore, when the random shaped fragments are fed through the press roller, there will be an accumulation of material at the front of the press roller. The height of the accumulation may be controlled by a number of factors including belt speed, press roller rotational speed, height or average height of the random shaped fragments, and distance between the press roller and the belt, or distance between a pair of rollers. The random shaped fragments of composite material will be squeezed by the roller or rollers and deformed into one piece to form a flat, uncured slab once it passes through the roller or rollers. The larger random shaped fragments also have a tendency to be squeezed away from the press roller towards smaller random shaped fragments, therefore shifting the vein pattern created by the colorant deposited on the side walls of the random shaped fragment.

In one or more embodiments of the present invention, there are film dispensers and removers attached to the press rollers to cover the press roller as it presses the fragments. The composite material is a damp particulate mixture which may stick to the press roller. To prevent this, a protective film may be applied by a film dispenser press roller upstream from the location the press roller comes into contact with the random fragments. Downstream from the press roller a film remover may remove or wind up the used film.

For example, the height of the distributed random shaped fragments piled up in front of the press roller may be 100.0 mm from the belt, and the gap between the press roller and belt may be 25.0 mm. The random shaped fragments will be pressed and squeezed by the roller or rollers to deform into a flat slab with a height of a little over 25.0 mm after exiting the press roller. The composite material has some elasticity so the final height may be slightly larger than the press roller height. Since the colorant was also applied to the side walls of the random shaped fragments, the subsequent colorant veining will appear not only on the top surface of the slab but also throughout the thickness of the slab which results in a desirable through bodied appearance of natural random vein patterns.

In one or more embodiments of the present invention, multiple sets of press rollers may be used sequentially in order to gradually compress the material over a plurality of press rollers or pair of press rollers. As an example, the height of the random shaped fragments piled up in front of the press roller may be 100.0 mm from the belt, the gap between first press roller and the belt or pair of press rollers may be 30.0 mm, and the gap between the second press roller or pair of press rollers may be 25.0 mm.

In one or more embodiments of the present invention, the random shaped fragments may be deposited onto a stationary supporting structure, and the press roller or pair of press rollers may be designed to move along a track back and forth in order to compress the random shaped fragments, similar to a rolling pin across dough. The height of the press roller or pair of press rollers may be adjustable.

Notably while covering more surface area of any particular random shaped fragment is desirable, coating more of the side walls, or vertical surfaces, of a random shaped fragment is also important depending on the desired final design aesthetic. The press roller or rollers has a tendency to substantially stretch the composite material in the horizontal direction, but very little stretching in the vertical direction. Therefore, if colorant is only on the top surface of the composite material, or of the composite material is slightly pressed with a flat top surface, the colorant will substantially remain on the top surface after passing through the press roller. For example, if a random shaped fragment has significantly more horizontal surface area such as a flat disc, all the colorant on the top surface of the disc will remain substantially on top after passing through the press roller. This will lead to the colorant appearing on the horizontal top surface of the slab as opposed to having a through bodied appearance in the vertical direction. If however the random shaped fragment is a cylinder with more height than width and colorant is applied throughout the height of the side walls, the colorant on the randomly shaped vertical surface will elongate in the horizontal direction after passing through the press roller and deformed. The subsequent appearance of the slab will not only have visible colorant veining on the horizontal surface, but also will have random veining through the body of the slab in the vertical direction.

Figure 10:
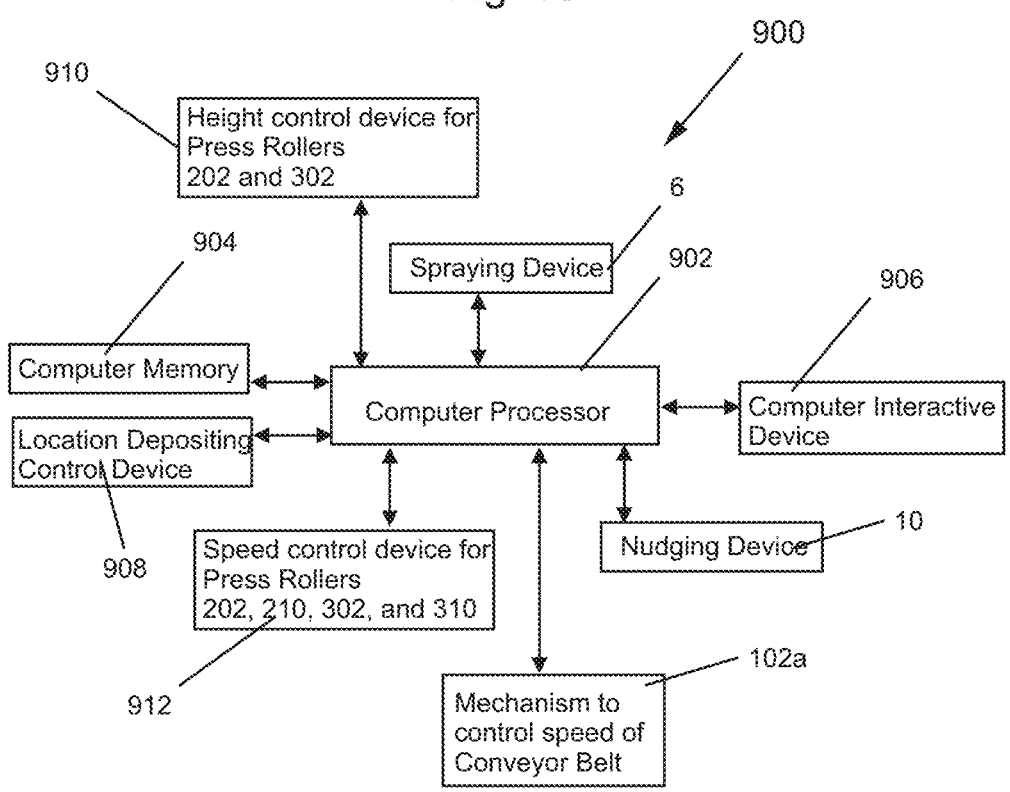
FIG. 10 shows a simplified block diagram of components for use with an embodiment of the present invention.

FIG. 10 shows a simplified block diagram 900 of components for use with an embodiment of the present invention. The block diagram 900 shows computer processor 902, computer memory 904, and computer interactive device 906. The computer interactive device 906 may include, for example, a computer touchscreen, computer mouse, and/or computer keyboard. The block diagram 900 also refers to nudging device 10 previously shown in FIGS. 1 and 2.

As shown in FIG. 10, the computer processor 902 communicates with, at least, spraying device 6, nudging device 10, location depositing control device 908, speed control device 912 (or devices) for press rollers 202 and 302, height control device 910 for press rollers 202 and 302, and a mechanism 102*a* for controlling the speed of conveyor belt 102.

One embodiment of the present invention may include the nudging device 10 controlled by CNC, such as by using computer processor 902 as programmed by computer software stored in computer memory 904, in which a narrow head at end 10*a* of the nudging device 10 is used so that the device 10 does not carve through the random shaped fragments, breaking or compressing them. Rather this device 10 is configured to slightly push the plurality of random shaped fragments aside and retain their random shape.

The device 10 has an end 10*a* and an opposite end 10*b*. The device 10 has a head 10*c* and a tail 10*d*.

The tail 10*d* is elongated, and has a width W1, a length L1, and a height H1 as shown in FIG. 2. The width W1 is preferably the same over the entire length L1. The dimensions W1, L1, and H1 may be 2.0 mm, 90.0 mm, and 80.0 mm, respectively, so that the tail 10*d* is elongated.

The elongated narrow tail 10*d* is preferably made from a flat rigid plate and may be attached to the head 10*c* and be configured to oscillate back and forth like a pendulum by rotating about axis 16 to further push the random shaped fragments aside, but not push so hard as to deform or break the random shaped fragments. The distance of oscillation may vary based on design requirements such as the desired width of the channel to be formed, and the force of oscillation may vary based on the specific formula used to form the random shaped fragments. The oscillation of the nudging device 10 forms a channel within the plurality of fragments, which has a somewhat random edge profile due to the random shape of the plurality of fragments pushed aside which are not broken or deformed and/or are not substantially broken or deformed. This allows for a more realistic veining effect once the channel walls are coated with colorant and elongated through a press roller, or a pair of press rollers. This contrasts with the smooth channel walls formed, for example using a V-shaped cutting wheel type device, or any other form of known cutting device that travels through composite material.

After the channels are formed, additional layers of composite material or colorant may be applied to predefined areas. One example of such a method includes use of a spray gun or device 6 shown in FIG. 2 controlled by CNC (and/or by computer processor 902) to deposit colorant or colorants on top of certain regions of the plurality of random shaped fragments. In this manner the side walls of the plurality of randomly shaped fragments that have been moved by the nudging device 10 have colorant deposited onto them. Due to the proximity of each random shaped fragment along the path in which colorant is deposited, the colorant on each random shaped fragment will stretch into the adjoining random shaped fragment, simulating the appearance of a continuous long vein in the slab after passing through a press roller, such a press roller 202 or 302 of FIG. 4. Since each random shaped fragment is squeezed and deformed differently, the continuous long vein will have a somewhat random zig zag pattern, better simulating the random veining found in natural stone.

The size of the random shaped fragments is important in controlling the amount of volume that has colorant applied to it. As random shaped fragment size gets smaller, there is less volume that has the original color of the composite material, until the particle size becomes so small as to change the color of the entirety of the composite material to the color of the colorant. After passing through the press roller, such as either press roller 202 or 302 of FIG. 4, the smaller fragments would lead to an undesirable monochrome or short veined appearance.

Another method to ensure that a significant amount of vertical surface area is coated by colorant is to deposit random shaped fragments that are significantly larger than others on a conveyor belt, such as conveyor belt 102 or other supporting structure. The location on the conveyor belt 102 or other supporting structure in which each large random shaped fragment is deposited may be controlled by for example by location depositing control device 908, shown in FIG. 10, as controlled by computer processor 902. This will ensure that a significant portion of the large random shaped fragment's side walls are coated in colorant, and if enough of these large random shaped fragments are close together, after passing through the press roller, such as rollers 200 and 300, the random shaped fragments will connect and create a long veined effect.

The larger the random shaped fragment sizes or the more random shaped fragments that are distributed onto the belt 102 of FIG. 1, the more deformed and stretched the composite material will become after passing through the press roller or rollers 202 and 302. This will result in elongated veining that is somewhat controllably stretched depending on how much composite material is piled up in front of the press roller 202 or 302. If not enough composite material is piled up in front of the press roller 202 and/or 302 shown in FIG. 4, the amount the composite material is stretched will be minimal. To an extreme, if there is not enough material the fragments will not be compressed and will exit the press roller as fragments and not a singular piece of a flat slab. If too much material is piled up in front of the press roller 202 and/or 302, the composite material will stretch too much. There is a specific amount of stretching desired depending on what final design aesthetic is required. In addition, the speed of the belt 102 may be increased by the computer processor 902 in order to cause more random shaped fragments to pile up in front of the press roller 202 or 302 or slowed down to cause less random shaped fragments to pile up in front of the press roller 202 or 302.

The rotational speed of the press roller or pair of press rollers 202 and 302 (controlled by computer processor 902 through device 912) as well as the height between the belt 102 and the press roller or pair of press rollers 202 and 302 (controlled by computer processor 902 through device 910) will also influence the degree of deformation of the random shaped fragments of composite material.

In one or more embodiments of the current invention, the colorant is deposited, such as by spraying device 6, along a predefined pattern or track that connects a plurality of fragments by depositing colorant not only on the surface but also along the height of the side walls of the fragments. After depositing the colorant and passing through the press roller or rollers 202 and 302, the subsequent elongated through bodied veins will appear as a continuous vein on the surface of the processed slab.

Fragment size is typically controlled depending on a variety of factors including the desired final design aesthetic and the method in which additional layers of composite material or colorant is to be deposited onto the surface area or side walls of the fragments. After applying the colorant this will form a desired pattern on the individual or a plurality of the fragments. This is used in combination with the press roller or rollers 202 and 302 to obtain the desired result.

There are other embodiments that utilize apparatuses and devices to push fragments aside, other than the aforementioned nudging device 10, to expose more surface area or side walls of the fragments while still maintaining the fragment shape and not breaking or deforming the fragments.

Variables may be adjusted and stored in computer memory 904 to control, through computer software executed by computer processor 902, how much the composite material deforms and stretches after passing through the press roller or rollers 202 and 302. The distance between the press roller and the belt, the height and amount of fragments of composite material, and the speed of the belt 102 feeding the press roller or rollers 202 and 302 are all controlled by computer processor 902, in at least one embodiment.

Figure 11:
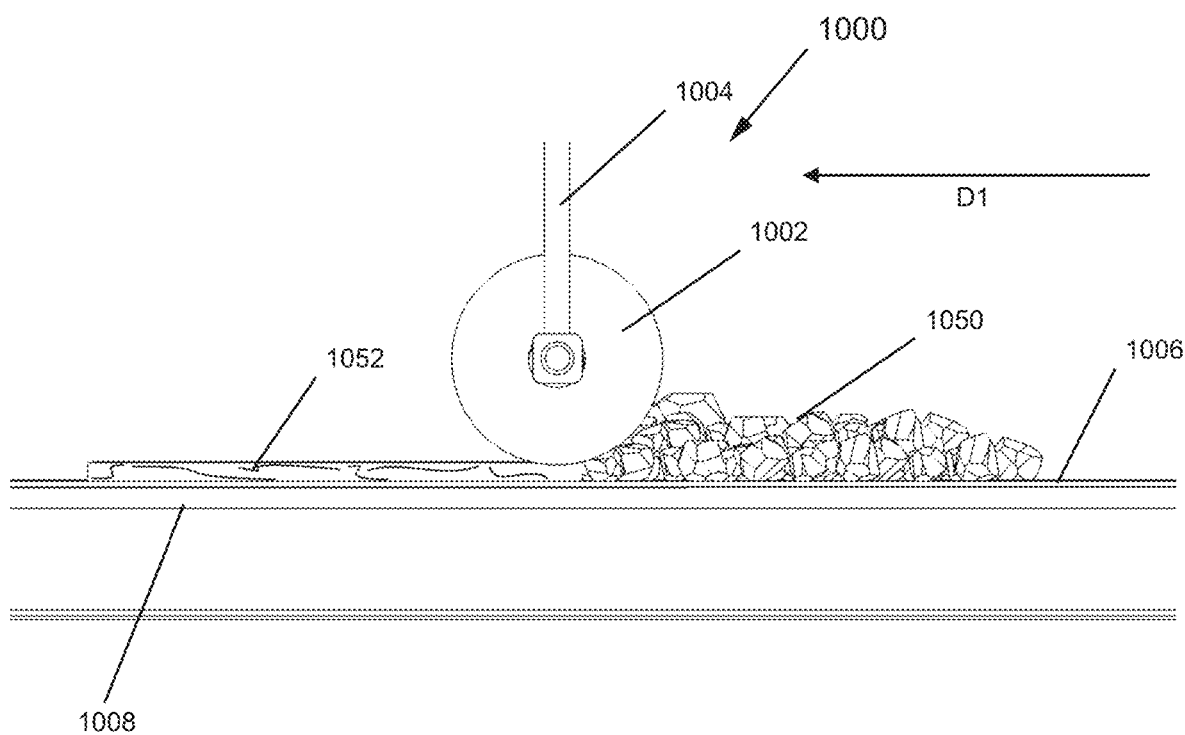
FIG. 11 shows a side view of a press roller in an embodiment of the present invention during operation in which fragments of composite material are being deformed, stretched and compressed into one piece to form a flat slab by the press roller.

FIG. 11 shows a simplified diagram 1000 of a side view of a press roller 1002 rotatably mounted to a member 1004 in an embodiment of the present invention during operation in which at least some of the plurality of fragments 1050 of a composite material are being compressed by the press roller 1002, and the remaining fragments of 1050 are going to be compressed as a conveyor belt 1006 moves in the direction D1 to move the fragments 1050 into the towards the roller 1002. The component 1052 represents fragments that have been compressed by the roller 1002 into a single piece with through bodied veins throughout the compressed, uncured slab. FIG. 11 also shows steel plate 1008 on which the conveyor belt 1006 moves.

Figure 12:
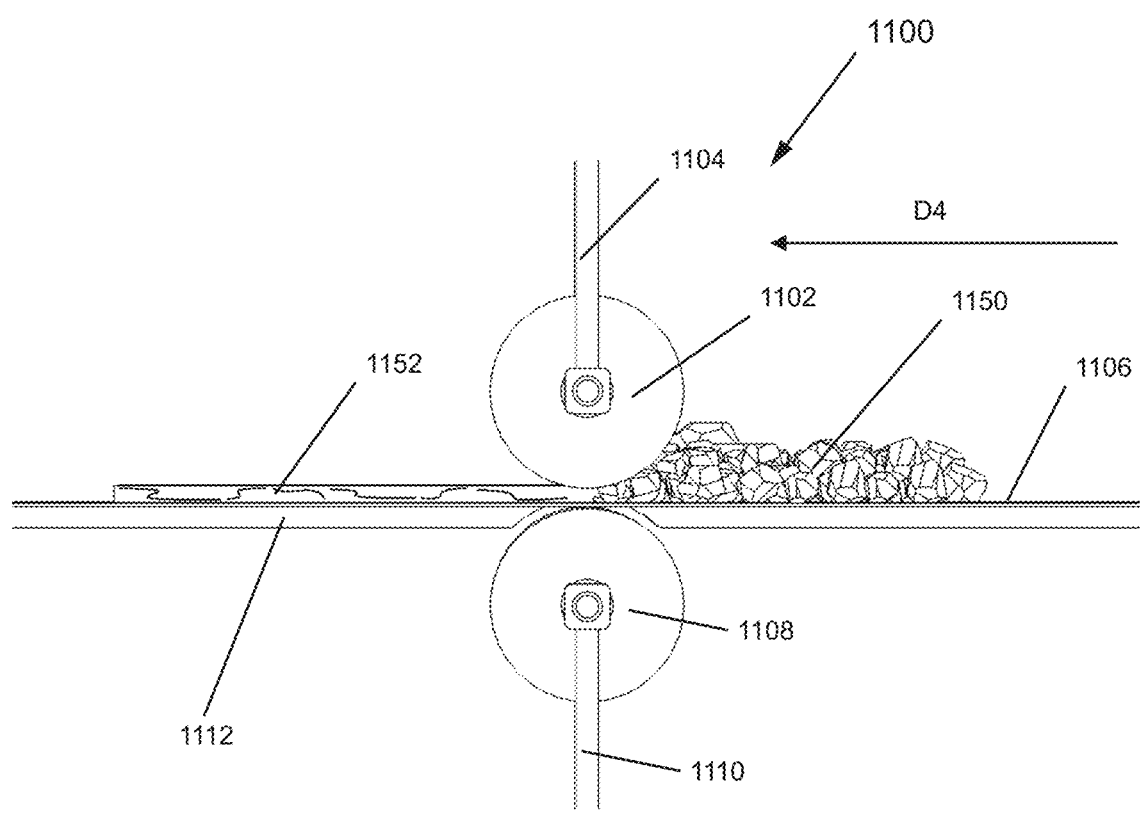
FIG. 12 shows a side view of a pair of press rollers for use in accordance with an embodiment of the present invention.

FIG. 12 shows a simplified diagram 1100 of a side view of a press roller 1102 rotatably mounted to a member 1104 in an embodiment of the present invention during operation in which at least some of the plurality of fragments 1150 of a composite material are being compressed by the press roller 1102, and a press roller 1108, and the remaining fragments of 1150 are going to be compressed as a conveyor belt 1106 moves in the direction D4 to move the fragments 1150 towards the gap between rollers 1102 and 1108. The component 1152 represents fragments that have been compressed by a combination of the rollers 1102 and 1108 into a single piece with through bodied veins throughout the compressed, uncured slab. FIG. 12 also shows steel plate 1112 on which the conveyor belt 1106 moves.

In the FIG. 12 embodiment, the press roller 1108 underneath the conveyor belt 1106 also rotates in order to assist in making sure there is not a braking effect due to the friction between the top press roller 1102 and the conveyor belt 1106.

Figure 13:
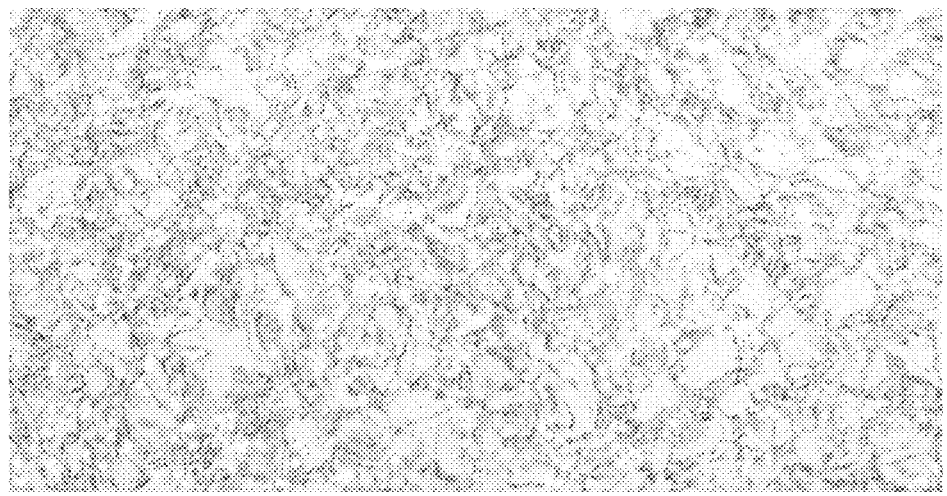
FIG. 13 shows a slab produced using techniques known in the prior art that include coating fragments with colorant which forms short veins within each individual fragment but do not connect to shot veins formed by other fragments, as opposed to in the present invention which gives the appearance of a long, connected vein that travels a significant distance throughout the slab.

FIG. 13 shows a slab produced using techniques known in the prior art that include coating fragments with colorant which forms short veins within each individual fragment but do not connect to shot veins formed by other fragments, as opposed to in the present invention which gives the appearance of a long, connected vein that travels a significant distance throughout the slab.

A significant advantage of one or more embodiments of the present invention is the ability to have a continuous run of material as opposed to forming slabs one at a time. In addition to cost savings it may be aesthetically advantageous to produce lengths of slabs longer than a standard slab length (wherein the standard slab length is typically 3.2 meters). This is because if you were to produce a single slab, the degree of stretching present at the front or back of the slab may be significantly different than in the middle since there is not enough material accumulated in front of the press roller at these points. If for example a length of ten slabs were produced continuously, the material at the front and back of the length of slabs may be discarded and the remainder cut into 3.2 meter length increments for further processing.

Another significant advantage of the one or more embodiments of the present invention is the ability to save material cost. It is very difficult to distribute material evenly throughout a large enough format such as the area of a slab, which may be 1.6 meters×3.2 meters with an example thickness of 60.0 mm. The vibration and compaction step may level local regions out, however if one end of the slab has more material than the other end, it is difficult to level. In production the slabs are generally produced thicker than would otherwise be necessary in order to accommodate this unevenness, and then the slab is ground down to the correct size in a later step in the process. For example, if a final product thickness of 30.0 mm is desired, a slab thickness of 36.0 mm may be produced and later grinded and polished to 30.0 mm, wasting the additional 6.0 mm of material. By using a press roller or similar device to squeeze any excess material flat, it is possible to produce slabs that are much more consistent and flat compared to the prior art, allowing for the production of slabs thinner than 36.0 mm while still maintaining a final product thickness of 30.0 mm.

Figure 14:
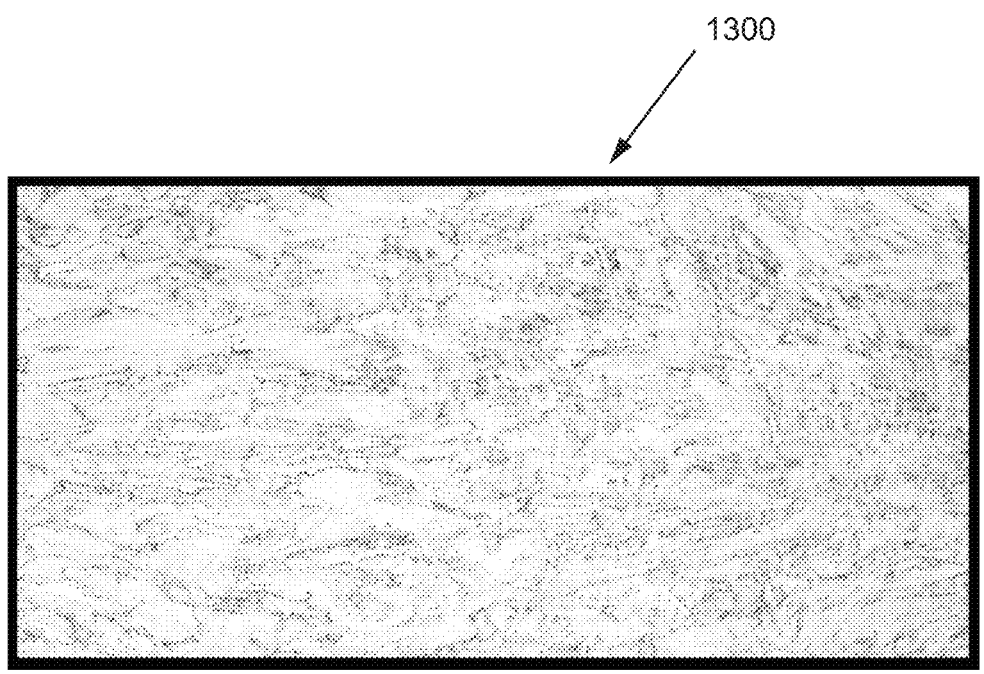
FIG. 14 shows an image of a slab produced in a single batch, in accordance with an embodiment of the present invention, as opposed to continuously, wherein the degree of stretching on the left hand side is very different than the right hand side.

FIG. 14 shows an image 1300 of a slab produced in a single batch, in accordance with an embodiment of the present invention, as opposed to continuously, wherein the degree of stretching on the left hand side is very different than the right hand side.

Figure 15:
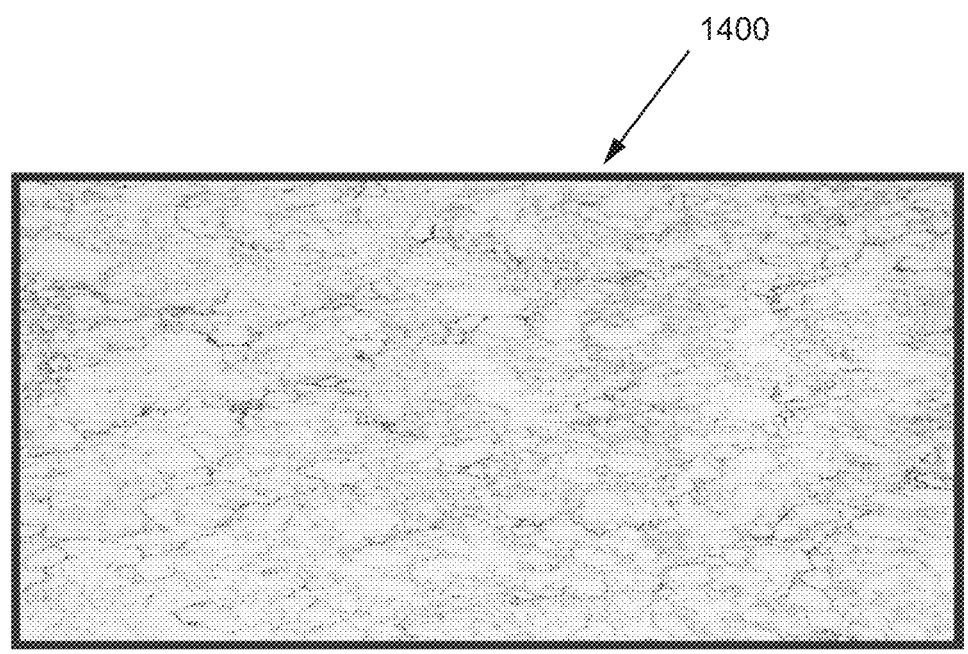
FIG. 15 shows an image of a slab produced in a continuous run, in accordance with an embodiment of the present invention, wherein the degree of stretching is substantially uniform throughout the length of the slab.

FIG. 15 shows an image of a slab 1400 produced in a continuous run, in accordance with an embodiment of the present invention, wherein the degree of stretching is substantially uniform throughout the length of the slab.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

What is claimed is:

1. A method for producing engineered stone slabs comprising the steps of:
    compressing a composite material to form compressed composite material during a first step of compressing;
    fragmenting the compressed composite material into a plurality of fragments of the composite material;
    depositing at least some of the plurality of fragments into a pile onto a surface, which is supported by a supporting structure, so that at least one of the plurality of fragments is on top of at least one other fragment of the plurality of fragments;
    prior to forming the at least some of the plurality of fragments into a slab, depositing colorant in a predefined region onto at least part of side walls of the at least some of the plurality of fragments of the composite material; and then
    using a press roller, during a second step of compressing, to press, flatten and stretch the plurality of fragments of the composite material into a slab, after depositing the colorant;
    wherein the first step of compressing occurs before the plurality of fragments are formed; and
    wherein the second step of compressing occurs after the step of depositing at least some of the plurality of fragments into the pile onto the surface.

2. The method of claim 1, further comprising, after fragmenting the compressed composite material and before using the press roller during the second step of compressing, moving at least some of the plurality of fragments without substantially breaking or deforming said at least some of the plurality of fragments to form an elongate channel in the plurality of fragments deposited on the surface, wherein the elongate channel forms a non-linear pattern and has a random edge profile that is not smooth; and wherein depositing colorant includes depositing the colorant within the elongate channel to thereby coat the at least part of the side walls of the at least some of the plurality of fragments forming the random edge profile of the channel.

3. The method of claim 1, further comprising using a second press roller to press, flatten and stretch the plurality of fragments at about the same time as the first press roller; and wherein the plurality of fragments pass between the first and second press rollers to press, flatten and stretch the plurality of fragments of composite material into the slab.

4. The method of claim 1, wherein a portion of the plurality of fragments with colorant deposited onto them are arranged in a predefined pattern on the surface prior to using the press roller to press, flatten and stretch the plurality of fragments of composite material into the slab.

5. The method of claim 1, wherein at least a first set of fragments of the plurality of fragments are arranged in a predefined pattern on the surface prior to depositing colorant on the at least first set of the plurality of fragments.

6. The method of claim 1, wherein each of the plurality of fragments is three dimensional and has a length, a width, and a height, wherein each of the length, and the width, of each of the plurality of fragments is substantially smaller than each of a length and a width of the slab; and wherein the height of at least some of the plurality of fragments is larger than the height of the slab.

7. The method of claim 1, wherein the plurality of fragments are distributed onto the surface so that any region of the surface having a square footage does not have substantially more composite material than any other region of the surface having a square footage.

8. A method for producing engineered stone slabs comprising:

compressing composite material to form compressed composite material;

fragmenting the compressed composite material into a plurality of fragments of composite material, wherein the plurality of fragments are significantly varied in fragment size;

distributing the plurality of fragments onto a surface, which is supported by a conveyor belt;

depositing colorant in a predefined region onto at least part of side walls of at least some of the plurality of fragments of composite material;

accumulating a pile of at least some of the plurality of fragments on the surface in front of a first press roller by adjusting a height of the first press roller above the surface to thereby control a height of the accumulation of the at least some of the plurality of fragments on the surface in front of the first press roller, wherein the height of the first press roller above the surface is controlled to be significantly less than the height of the accumulation of the at least some of the plurality of fragments on the surface in front of the first press roller; and using the first press roller to press, flatten and stretch the plurality of fragments of composite material and colorant into a slab, wherein the height of the first press roller above the surface affects a degree of horizontal stretching of the plurality of fragments and colorant by the first press roller; and wherein the degree of horizontal stretching of the plurality of fragments and colorant by the first press roller is significantly greater than a degree of vertical flattening of the plurality of fragments by the first press roller.

9. A method for producing engineered stone slabs comprising:

compressing composite material to form compressed composite material;

fragmenting the compressed composite material into a plurality of fragments of composite material before depositing the plurality of fragments onto a surface, which is supported by a supporting structure;

depositing the plurality of fragments onto the surface in a pile such that the plurality of fragments are distributed on the surface;

depositing colorant in a predefined region onto at least part of side walls of at least some of the plurality of fragments of composite material deposited onto the surface; and using a press roller to press, flatten and stretch the plurality of fragments of composite material and colorant into a flat slab, while the plurality of fragments and colorant are on the surface;

wherein the pile of the plurality of fragments deposited onto the surface in front of the press roller has a height from the surface which is greater than a height of the flat slab.

10. The method of claim 9, wherein the plurality of fragments are randomly shaped.

11. The method of claim 9, wherein the supporting structure is a conveyor belt.

12. The method of claim 11, further comprising accumulating the plurality of fragments deposited onto the surface in the pile in front of the press roller;

wherein a height of the accumulated plurality of fragments is substantially greater than a gap between the press roller and the conveyor belt.

13. The method of claim 1, wherein the step of fragmenting the compressed composite material into a plurality of fragments of composite material includes dropping the compressed composite material from a height.

14. The method of claim 13, wherein the step of fragmenting the compressed composite material into a plurality of fragments of composite material includes dropping the compressed composite material onto a sieve from the height.

15. The method of claim 1, wherein a largest dimension of at least some of the plurality of fragments is different from a largest dimension of at least others of the plurality of fragments, and wherein the largest dimension of at least some of the plurality of fragments and the largest dimension of at least others of the plurality of fragments is between 25.0 millimeters and 250.0 millimeters.

16. The method of claim 1, wherein the slab is part of a continuous length of material formed by the second step of compressing, and wherein the method further comprises:

after the second step of compressing, cutting the continuous length of material to form the slab; and then after cutting the continuous length of material to form the slab, curing the cut slab.

* * * * *